United States Patent
Valdez

(10) Patent No.: US 8,213,920 B2
(45) Date of Patent: Jul. 3, 2012

(54) WIRELESS CALL HANDOFF

(75) Inventor: John Valdez, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 497 days.

(21) Appl. No.: 12/464,443

(22) Filed: May 12, 2009

(65) Prior Publication Data

US 2010/0291928 A1    Nov. 18, 2010

(51) Int. Cl.
*H04M 3/42*    (2006.01)

(52) U.S. Cl. .................. 455/417; 455/414.1; 455/426.1; 455/445; 455/41.2; 455/41.3; 370/351; 370/352; 370/353; 370/354; 370/355; 379/201.01; 379/201.12; 379/201.1; 379/212.01; 379/212.02

(58) Field of Classification Search ............... 455/414.1, 455/424, 425, 426.1, 426.2, 434, 445, 41.2, 455/41.3, 556.1, 556.2, 557, 569.1, 569.2, 455/414.3, 417; 370/338, 401, 351–356; 379/212.01, 212.02, 211.01, 201.01, 201.12, 379/215.01

See application file for complete search history.

(56) References Cited

U.S. PATENT DOCUMENTS

| | | | | |
|---|---|---|---|---|
| 7,496,358 | B2* | 2/2009 | Levien et al. | 455/417 |
| 7,536,179 | B2* | 5/2009 | Malamud et al. | 455/417 |
| 7,729,489 | B2* | 6/2010 | Lee et al. | 379/212.01 |
| 7,809,842 | B2* | 10/2010 | Moran et al. | 709/227 |
| 7,844,270 | B2* | 11/2010 | Sylvain | 455/436 |
| 2003/0073431 | A1* | 4/2003 | Dorenbosch | 455/417 |
| 2003/0195963 | A1* | 10/2003 | Song et al. | 709/227 |
| 2005/0033843 | A1* | 2/2005 | Shahi et al. | 709/226 |
| 2006/0286984 | A1* | 12/2006 | Bonner | 455/445 |
| 2008/0004002 | A1* | 1/2008 | Chin et al. | 455/425 |
| 2008/0014926 | A1* | 1/2008 | Ono | 455/426.1 |
| 2009/0111471 | A1* | 4/2009 | Li et al. | 455/437 |
| 2009/0209297 | A1* | 8/2009 | Suzuki | 455/569.2 |

* cited by examiner

*Primary Examiner* — Olumide T Ajibade Akonai

(57) ABSTRACT

A device is configured to detect a wireless device and determine if the wireless device is participating in a telephone call with a remote party. The device is further configured to establish a first voice communication link with the remote party, and establish a second voice communication link with the wireless device. In addition, the device is configured to bridge the first and second voice communication links together, thereby establishing voice communications between the wireless device and the remote party.

23 Claims, 4 Drawing Sheets

WIRELESS CALL HANDOFF

BACKGROUND INFORMATION

Many business and consumer users are turning to cordless headsets for use with their mobile devices for voice communications. A cordless headset is typically a wireless, hands-free device that works in conjunction with a mobile device to provide the equivalent functionality of a telephone (i.e. two-way voice communication). People often use a cordless headset while driving, walking, riding a train, etc. As an added incentive, many states and local municipalities have enacted laws banning the use of mobile devices while driving unless the driver is using a cordless headset.

Often times, people continue their telephone conversations after they have arrived at their destination, such as when a person arrives at their destination following their commute. Because many people would prefer to continue their conversations, they may switch from using their mobile device to their home telephone. However, this can be both time consuming and troublesome, thereby encouraging a person to continue using their mobile device instead. Of course, using a mobile device in a building can be problematic itself, as the walls of apartment buildings and houses often interfere with a wireless phone's reception, possibly degrading the quality of service. Additionally, should a person switch from using their mobile device to their home telephone, they often cannot continue using their cordless headset, or are required to switch to different headset.

DETAILED DESCRIPTION

Figure 1:
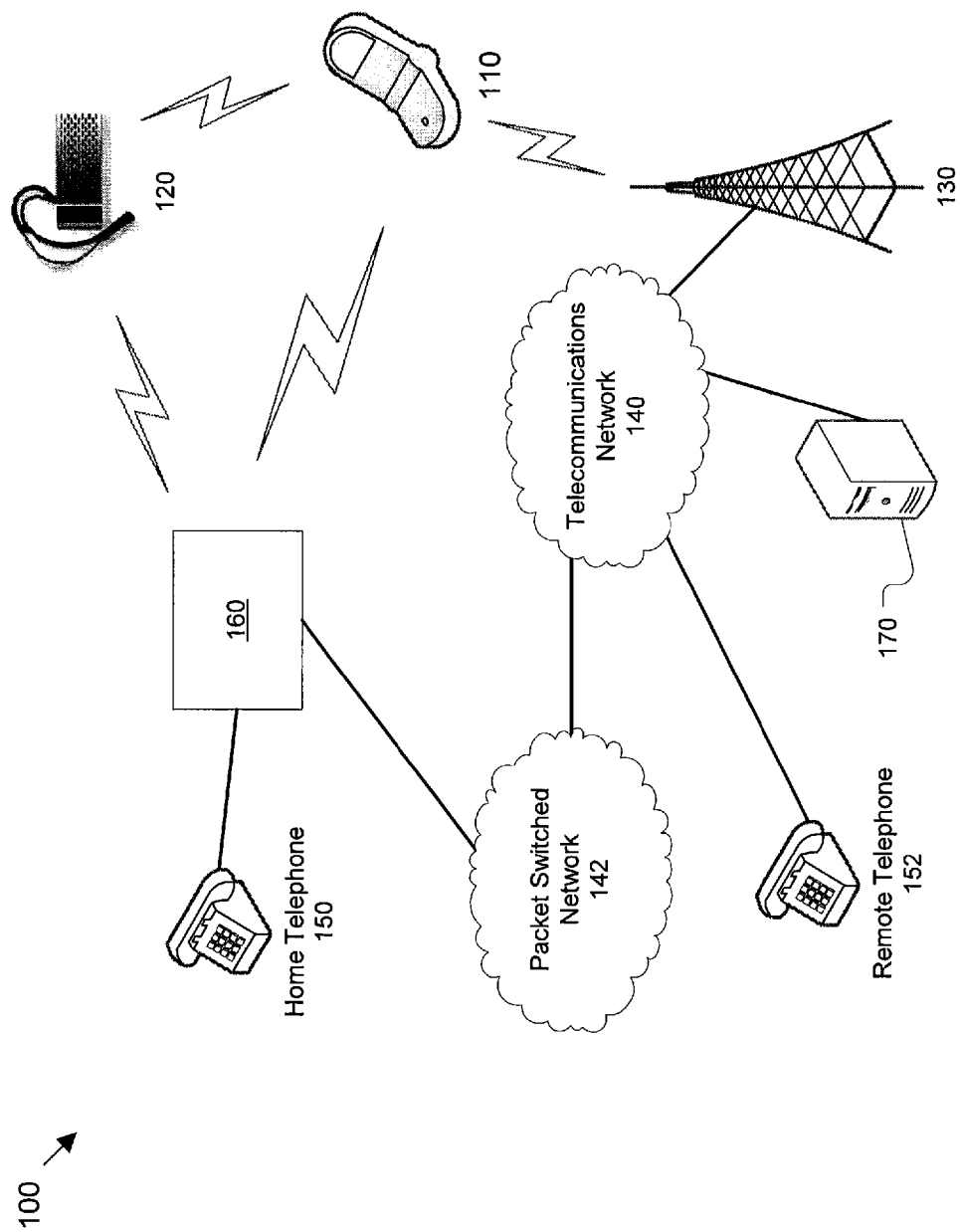
FIG. 1 illustrates an exemplary system for facilitating a wireless call handoff.

FIG. 1 illustrates an exemplary system 100 for transferring a telephone call from a mobile device to another telephone system. System 100 can also be used in conjunction with a cordless headset, allowing a user to continue using the cordless headset while a call is transferred between a mobile device and another telephone system. Typically, system 100 includes a mobile device 110 that can be used with a cordless headset 120. Generally, mobile device 110 operates by accessing a base station 130 that communicates with a telecommunications network 140, allowing mobile device 110 to conduct various voice and data communications with other devices, such as a remote telephone 152. Additionally, system 100 includes a base unit 160 that can communicate with various devices in system 100, including mobile device 110 and/or headset 120, and can typically provide telephone service.

Under certain wireless communication technologies, such as Bluetooth®, devices communicate by establishing parent/child relationships. Often times, certain devices are configured to be child devices and only establish communication links with parent devices. For example, mobile device 110 may be a parent device that is configured to only communicate with devices that operate in a child mode. However, other devices, such as cordless headset 120, may be child devices that are configured to only communicate with devices that operate in a parent mode. As discussed in more detail below, base unit 160 may be configured to switch between parent and child modes in order to establish wireless communication links with any device. Base unit 160 may then provide various services, such as a wireless call handoff, using the established communication links.

Mobile device 110 is typically any wireless device capable of facilitating voice communications over network 140. For example, mobile device 110 may be a cellular phone, a personal digital assistant, a hand held computer, a laptop, or the like. Mobile device 110 is typically capable of utilizing more than one wireless communication protocol. For example, mobile device 110 may be a cellular phone that can communicate voice and data over a wireless network, such as by communicating with base station 130, using code division multiple access (CDMA), time division multiple access (TDMA), global system for mobile communications (GSM), or the like. Additionally, mobile device 110 may also possibly communicate with various devices using such wireless protocols as Bluetooth®, WiFi® (i.e. IEEE 802.11), ZigBee®, Z-Wave®, OpenWave, or any other wireless communication protocol.

Mobile device 110 generally communicates with a base station 130 that is within a certain proximity of mobile device 110. Base station 130 typically transmits communication signals from mobile device 110 to a Mobile Telephone Switching Office (MTSO, not shown). Each MTSO is associated with one or more base stations 130, and each typically handles communications for a plurality of mobile devices 110 simultaneously or nearly simultaneously. Typically, mobile device 110, base station 130, or the MTSO will periodically communicate with a telecommunications server 170.

Telecommunications server 170 can be any type of computing device that typically includes a processor, a memory, and a computer readable medium. Server 170 may also include one or more databases for managing data. Server 170, among other things, can maintain a database of data about mobile device 110. For example, server 170 may include data such as a current location of mobile device 110, a base station identification of the base station 130 that is currently in communication with mobile device 110, and data about a currently established telephone call including mobile device 110.

For example, regarding data about a currently established telephone call, server 170 may include data such as the following: a device identification for mobile device 110, such as a mobile identification number (MIN), a dialing number (DIN), a media access control (MAC) address, an Internet protocol (IP) address, or some other type of device identification of mobile device 110; and a phone number for a remote party using remote telephone 152 that mobile device 110 is communicating with (or phone numbers if mobile device 110 is currently in a conference call with multiple parties). Server 170 can store such information in a relational database, which can be accessed by one or more devices that communicate via networks 140 and 142. For example, base unit 160 can be configured to communicate with server 170, accessing such stored information. Server 170 may also be configured to manage certain aspects of telephone calls involving mobile device 110, such as by adding a party, dropping a party, conferencing a party into an existing telephone call, etc.

Mobile device 110 is typically capable of communicating voice and/or data with any other telecommunications device by accessing network 140. Typically, mobile device 110 communicates with network 140 through base station 130 using a long-range cellular wireless technology, and communicates with devices such as headset 120 or base unit 160 using short to medium-ranged wireless technologies, like Bluetooth® or WiFi®. Thus, mobile device 110 is capable of simultaneous wireless communication with multiple devices over different operating frequencies and using different wireless protocols.

Headset 120 is typically a small, portable wireless device that facilitates voice communications through mobile device 110. Typically, headset 120 includes a speaker, a microphone, and a wireless communications system. Headset 120 is typically capable of communicating wirelessly with other devices using Bluetooth®, WiFi®, ZigBee®, Z-Wave®, OpenWave, or the like. Generally, headset 120 relies on short to medium-ranged wireless communications, such as Bluetooth®, that use less power than other wireless communication technologies. Headset 120 is typically capable of communicating with one or more devices, and may be configured to communicate with more than one device simultaneously. For example, as illustrated in FIG. 1, headset 120 is typically capable of communicating with both mobile device 110 and base unit 160.

Base unit 160 is typically one or more devices that facilitate voice and/or data communications between various devices over one or more networks, typically including connecting a user's home telephone 150 and computer (not shown) to networks 140 and 142. For example, base unit 160 may be a broadband modem and/or router that provides voice over Internet Protocol (VoIP) between a person's home telephone 150 and network 140. Base unit 160 is typically also capable of communicating with one or more devices via networks 140 and 142, such as server 170.

Base unit 160 is typically located in or around a destination location that may be associated with a user of mobile device 110 such as a home or office and connected to network 140 by a coaxial cable, a fiber optic cable, copper wires, or the like. Base unit 160 typically includes a processor, a memory, and a computer readable medium for storing computer readable instructions. Base unit 160 is also typically configured to communicate wirelessly with one or more devices, including mobile device 110 and headset 120. For example, base unit 160 is typically configured to communicate with another device, such as a home computer or a mobile device, using one or more mechanisms such as Ethernet, Bluetooth®, WiFi®, or any other wired or wireless communications mechanism. In one example, base unit 160 connects to network 140 over fiber optic cables, provides VoIP services to a home telephone 150, provides Internet services to a person's home computer(s), provides wired and/or wireless networking for a person's home computer(s), and can communicate wirelessly with mobile device 110 and headset 120 utilizing one or more wireless technologies, such as Bluetooth®, WiFi®, ZigBee®, Z-Wave®, OpenWave, or the like. In addition, base unit 160 may be configured to communicate with a cordless home telephone system utilizing various wireless communication systems, such as those using Digital Enhanced Cordless Telecommunications (DECT) or operating under one or more unregulated frequency bands.

When base unit 160 utilizes certain wireless technologies, such as Bluetooth®, base station 160 may be configured to switch between a child mode and a parent mode in order to establish wireless communications between various devices, regardless of that device's particular configuration or limitation (i.e. certain devices are configured to only communicate with parent devices). Base station 160 may be configured to detect a wireless device utilizing a discovery protocol, determine whether the detected device is a parent or child device, switch to an appropriate mode, and establish a wireless communication link with that device.

Telecommunications network 140 typically includes both wired and wireless communication networks, and enables telecommunications devices to communicate voice and data with one another. For example, network 140 typically facilitates voice and/or data communications between multiple mobile devices 110, telephones 150, computers, etc. Network 140 may connect to and/or include a Public Switched Telephone Network (PSTN), a wireless network, satellite communications, or any other network/equipment used to facilitate voice and/or data communications, allowing mobile device 110 to communicate with remote telephone 152, for example.

Networks 140 and 142 may include, but are not limited to, one or more Voice over Internet Protocol ("VOIP") networks, Public Switched Telephone Networks ("PSTNs"), overlay VOIP networks (e.g., a VOIP network overlaid on a PSTN), wireless communication networks (e.g., cellular telephone or satellite pager networks), wireline networks, packet-switched networks, circuit-switched networks, or any combination or subset of any applicable network such as those listed above. Networks 140 and 142 may be configured to carry one or more types of communication signals, including, but not limited to, Internet Protocol signals (i.e., IP-based signals), Time Division Multiplexing ("TDM") signals, Session Initiation Protocol ("SIP") signals, PSTN signals, wireless signals (e.g., Code Division Multiple Access ("CDMA"), Time Division Multiple Access ("TDMA"), and Global System for Mobile communication ("GSM") signals), voice signals, or any other communication signals. Although telecommunications network 140 may include one or more packet switched networks, FIG. 1 illustrates one example where network 140 is connected to a packet switched network 142, such as the Internet.

A user of mobile device 110 may arrive at a fixed location such as a home while engaged in a voice telephone call with a remote party using remote telephone 152 via network 140. At home, base unit 160 may provide certain services, such as home telephone service, wireless networking service, Internet service, etc. A user may desire a way to easily transfer the existing telephone call from mobile device 110 to a home telephone service using base unit 160. For example, a user may want to use home telephone 150, or simply use a home telephone service provided by base unit 160. Additionally, a user may desire a way to transfer the call with minimal interruption while allowing the user to continue using cordless headset 120.

Figure 2:
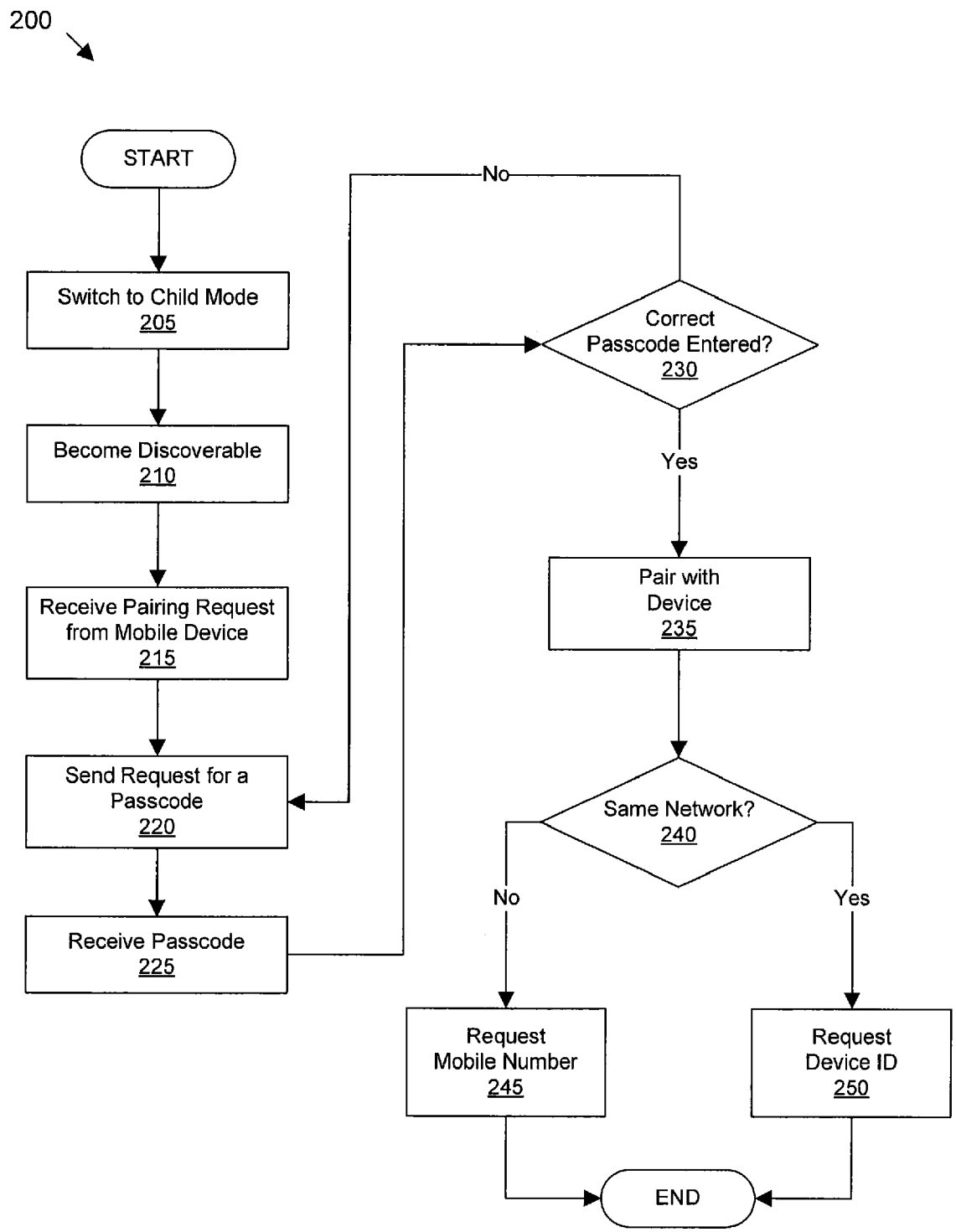
FIG. 2 illustrates an exemplary process for establishing a wireless communication link between a base unit and a mobile device.

FIG. 2 illustrates an exemplary process 200 for establishing a wireless communication link between base unit 160 and mobile device 110. While exemplary communication technologies are described herein in reference to certain illustrative approaches, including relying on the Bluetooth®protocol for wireless communications, other applicable approaches may use other suitable communication technologies for communications between the elements shown in FIG. 1. Of course, any suitable communications technology may be used to establish and carry communications between devices of system 100.

As previously discussed, certain wireless communication technologies, such as Bluetooth®, allow devices to communicate by establishing parent/child relationships between the devices. However, some devices may be limited to communicating with devices that are configured as one or the other, and unable to communicate with any device. For example, mobile device 110 may be a parent device that is configured to only communicate with devices that operate in a child mode, such as cordless headset 120. Base unit 160 may be configured to establish a wireless communication link with any device by switching between a parent mode and a child mode.

As discussed in detail below, process 200 illustrates an exemplary approach of establishing a wireless communication link between base unit 160 and mobile device 110. In process 200, base unit 160 switches to a child mode in order to establish a parent/child relationship with mobile device 110. Following process 200, base unit 160 is able to seamlessly communicate with mobile device 110. Process 300, on the other hand, illustrates an exemplary approach of establishing a wireless communication link between base unit 160 and cordless headset 120 by having base unit 160 switch to a parent mode. Following processes 200 and 300, base unit 160 may communicate wirelessly with both mobile device 110 and cordless headset 120.

Process 400 then illustrates an exemplary approach of facilitating a wireless call handoff. Base unit 160 must establish a communication link with at least one wireless device (either mobile device 110 or cordless headset 120) to facilitate a wireless call handoff. However, base unit 160 need not communicate with both devices in order to perform a wireless call handoff, as illustrated through process 400.

Process 200 begins in step 205 when base unit 160 switches to child mode. Base unit 160 may be configured to first detect a wireless device, determine whether the device is a parent or child device, and then switch to an appropriate mode. Certain wireless communications schemes, such as Bluetooth®, allow devices to communicate by establishing personal area networks (PANs), forming parent/child relationships, etc. In one example, base unit 160 and mobile device 110 each includes a Bluetooth® communications system. Mobile device 110 may be configured to establish a wireless communication link with other devices that present themselves as child or slave devices.

Next, in step 210, base unit 160 becomes discoverable. When base unit 160 is set to "discoverable" mode, base unit 160 begins sending wireless signals indicating that it is available to "pair" with another device and transmit data back and forth. Typically, many Bluetooth®devices can toggle their discoverability setting between on and off. When discoverability is off, the device will not appear when other devices perform a search. However, undiscoverable devices can still communicate with other Bluetooth®devices. During the discovery process, a discoverable device usually broadcasts certain information, such as a device identification and a device type, such as a cordless headset, a printer, a personal computer, a mobile device, etc.

Next, in step 215, base unit 160 receives a pairing request from mobile device 110. Depending on the type of wireless communication protocol, the request may include additional data, such as an encryption request, an encryption key, a passcode, etc.

Next, in step 220, base unit 160 requests a passcode from mobile device 110. In certain communication protocols, such as Bluetooth®, devices establish communications by sharing a key, such as a passcode. A passcode can be used for authentication and/or encryption. Of course, the particular authentication and encryption mechanisms generally depend on the particular communications protocol.

Next, in step 225, base unit 160 receives a passcode from mobile device 110. A passcode can include an alphanumeric code, a password, a hexadecimal code, a username and password, etc.

Next, in step 230, base unit 160 determines whether mobile device 110 sent the correct passcode. If the passcode is incorrect, base unit 160 proceeds to step 220 and requests a passcode again. If the received passcode is correct, base unit 160 proceeds to step 235.

In step 235, base unit 160 "pairs" or establishes a wireless communication link with mobile device 110. Base unit 160 may send a confirmation to mobile device 110, informing mobile device 110 that the wireless communication link was successfully established.

Next, in step 240, base unit 160 attempts to determine whether base unit 160 and mobile device 110 operate on the same provider's network. For example, a particular provider may provide both home broadband communications to base unit 160, as well as wireless communications to mobile device 110. Base unit 160 may be programmed with a particular provider identification, and may query mobile device 110 to determine if mobile device 110 shares the same provider network. Additionally, base unit 160 may rely on server 170 to determine if mobile device 110 and base unit 160 operate on the same provider's network. For example, base unit 160 may receive a device identification from mobile device 110, and query server 170 to make the determination. If base unit 160 and mobile device 110 utilize that same provider's network, base unit 160 may be able to access certain services to facilitate a call handoff, among other things. If base unit 160 and mobile device 110 are not on the same provider's network, base unit 160 proceeds to step 245. If they are on the same provider's network, base unit 160 proceeds to step 250.

In step 245, base unit 160 requests a mobile number or a mobile dialing number (MDN) from mobile device 110. The mobile number or mobile dialing number (MDN) is typically the ten digit telephone number. However, the mobile number can be any one of a number of different identification numbers used to establish voice communications with mobile device 110 over network 140.

In step 250, base unit 160 requests a device identification from mobile device 110. A device ID may be a media access control (MAC) address, a mobile identification number (MIN), or any other identification used to identify mobile device 110 on network 140. For example, a device ID may be a mobile MAC address used by server 170 to manage and/or track calls in session with a remote party, such as remote telephone 152, as will be discussed in greater detail below.

Following step 245 or step 250, process 200 ends. After base unit 160 performs process 200, base unit 160 and mobile device 110 may have established a wireless communication link. The wireless communication link established between base unit 160 and mobile device 110 can potentially use one or more security measures, such as any one of a number of different authentication and encryption mechanisms. Although process 200 was described in relation to a parent/child communication mechanism, such as Bluetooth®, any suitable wireless communication mechanism/protocol can be used to establish the wireless communication link and share data between base unit 160 and mobile device 110. Generally, the wireless communication link between base unit 160 and mobile device 110 can be used for wireless voice communications. In addition, the wireless communication can also be used to allow base unit 160 to access data stored on mobile device 110. For example, some mobile devices 110 may allow base unit 160 to access data stored on the mobile device itself For example, base unit 160 may be allowed to access a phone book, a call session log, device preferences, or any other data stored on mobile device 110. Such data may further enable a wireless call handoff, as discussed in greater detail below.

Figure 3:
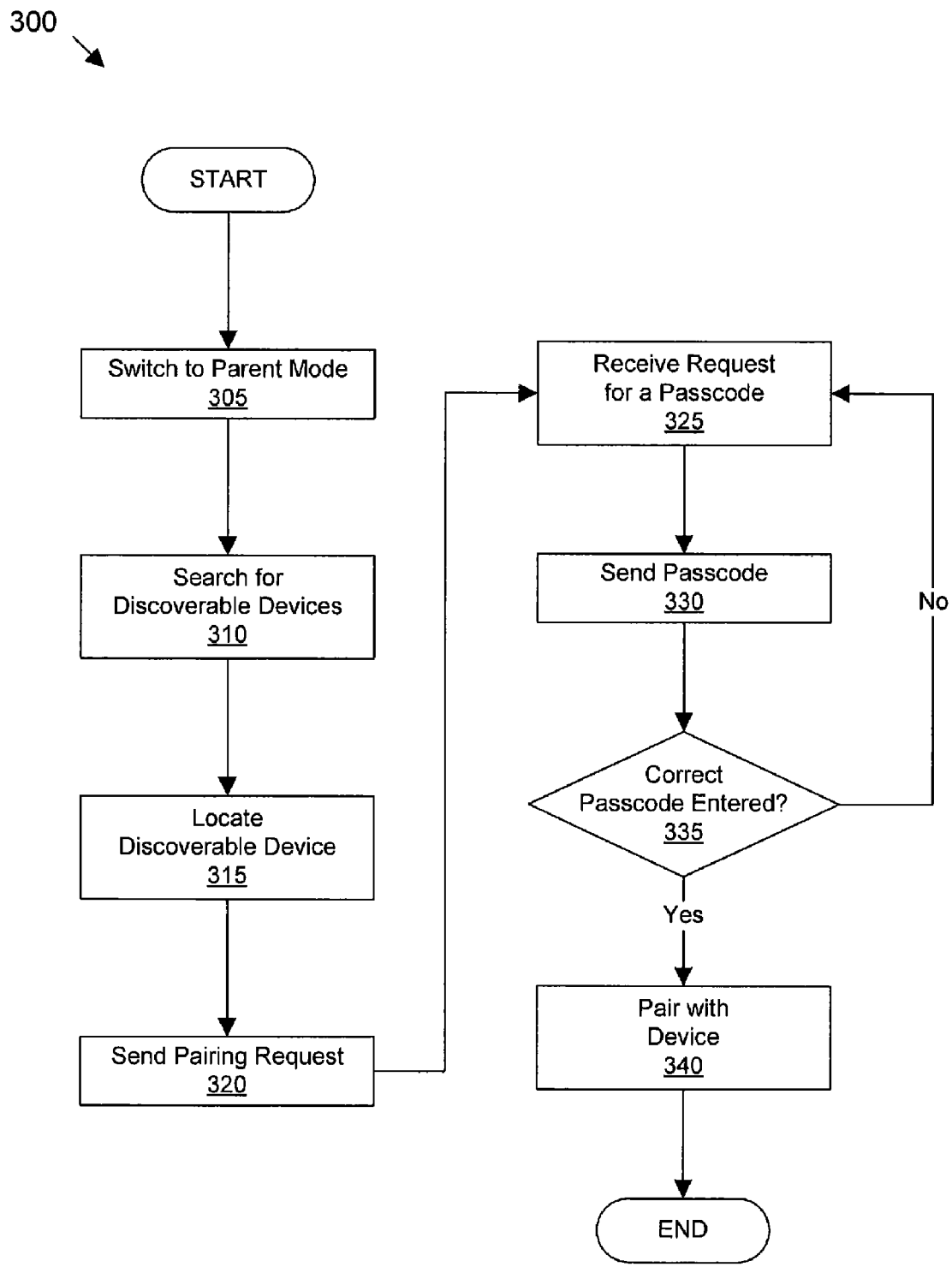
FIG. 3 illustrates an exemplary process for establishing a wireless communication link between a base unit and a cordless headset.

FIG. 3 illustrates an exemplary process 300 for establishing a wireless communication link between base unit 160 and cordless headset 120. Again, while exemplary communication technologies are described herein in reference to certain embodiments, including relying on the Bluetooth® protocol for wireless communications, other embodiments may use other suitable communication technologies for communications between the elements shown in FIG. 1.

Process 300 begins in step 305 when base unit 160 switches to parent mode. As previously discussed, certain wireless communications technologies, such as Bluetooth®, allow devices to communicate by forming parent/child relationships. Also as previously discussed, base unit 160 may be configured to first detect a wireless device, determine whether the device is a parent or child device, and then switch to an appropriate mode. In one example, base unit 160 and cordless headset 120 each includes a Bluetooth® communications system.

Next, in step 310, base unit 160 searches for discoverable devices. Generally, other devices, such as cordless headset 120, can be placed into a discoverable mode, where they send out announcement signals indicating that they are available to "pair" with another device. During the discovery process, cordless headset 120 may broadcast certain information, such as a device identification and a device type.

Next, in step 315, base unit 160 locates a discoverable device, such as cordless headset 120. Typically, base unit 160 will receive some identifying information from cordless headset 120 during the discovery process, where cordless headset 120 can identify itself by name and device type.

Next, in step 320, base unit 160 sends a pairing request to cordless headset 120. The pairing request may be in response to a user input, or may be generated automatically upon recognizing that a discoverable device is cordless headset 120.

Next, in step 325, base unit 160 receives a request for a passcode from cordless headset 120. A passcode can be used for authentication and/or encryption. Of course, the particular authentication and encryption mechanism generally depends on the particular communications protocol.

Next, in step 330, base unit 160 sends a passcode to cordless headset 120. The passcode may be entered by a user, or may be stored internally and sent automatically in response to the request. A passcode can include an alphanumeric code, a password, a hexadecimal code, a username and password, etc.

Next, in step 335, cordless headset 120 determines whether base unit 160 sent the correct passcode. If the passcode is incorrect, cordless headset 120 may send another request for a passcode. If the passcode is correct, base unit 160 proceeds to step 340.

In step 340, base unit 160 "pairs" or establishes a wireless communication link with cordless headset 120. Base unit 160 may send a confirmation to cordless headset 120, informing cordless headset 120 that the wireless communication link was successfully established.

Following step 340, process 300 ends. After base unit 160 performs process 300, base unit 160 and cordless headset 120 may have established a wireless communication link, allowing the two devices to communicate wirelessly whenever the devices are within range of one another. The wireless communication link established between base unit 160 and cordless headset 120 can potentially use one or more security measures, such as any one of a number of different authentication and encryption mechanisms. Additionally, the wireless communication link established between base unit 160 and cordless headset 120 can typically be used for voice communications. Although process 300 was also described in relation to a parent/child communication mechanism, such as Bluetooth®, any suitable wireless communication mechanism/protocol can be used to establish the wireless communication link and share data, including voice communication, between base unit 160 and cordless headset 120.

Figure 4:
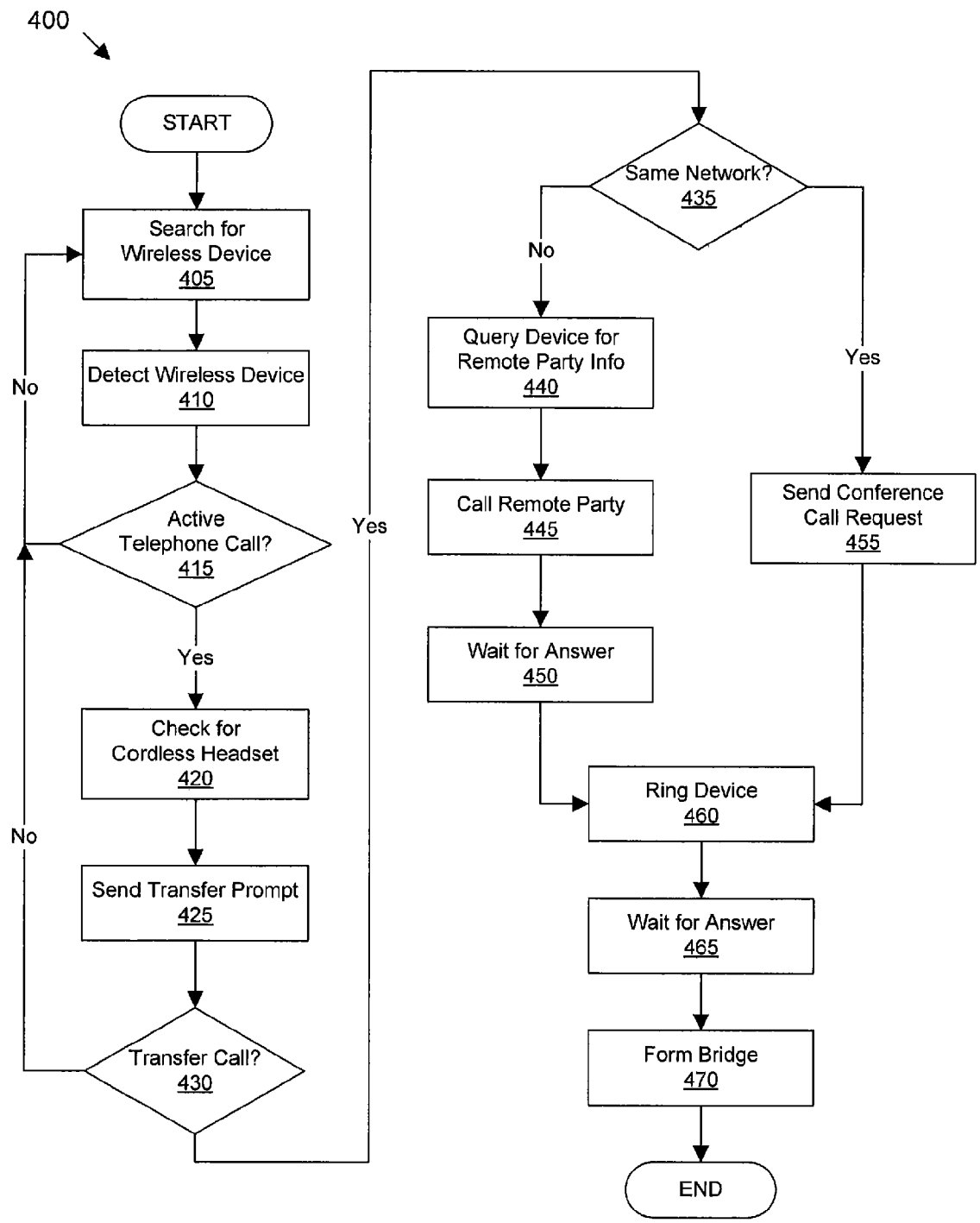
FIG. 4 illustrates an exemplary process for facilitating a wireless call handoff.

FIG. 4 illustrates an exemplary process 400 for facilitating a wireless call handoff. Process 400 is directed to facilitating a wireless call handoff when mobile device 110 is currently in a call, and a user desires to transfer/handoff the call to base unit 160 in order to continue the conversation using home telephone service provided using base unit 160.

Process 400 begins in step 405 when base unit 160 searches for a wireless device. A wireless device could include mobile device 110, cordless headset 120, or any other suitable wireless device that is capable of establishing a voice communication link with base unit 160. Searching for a wireless device may include passive listening on certain radio frequencies, utilizing a discovery protocol, waiting for a beacon or some other wireless transmission from a wireless device, etc. Searching for a device may also include base unit 160 attempting to contact devices with which base unit 160 has previously paired or with which base unit 160 has previously established a wireless communication link. For example, base unit 160 may have previously established wireless communication links with both mobile device 110 and cordless headset 120, as illustrated through processes 200 and 300. Searching for such wireless devices may include periodically attempting to contact those devices. For example, base unit 160 may "ping" or attempt to contact those devices every ten seconds, once every minute, or according to any other schedule. In addition, base unit 160 may utilize a discovery protocol to passively listen for a wireless device.

Next, in step 410, base unit 160 detects a wireless device. As previously discussed, detecting a device may simply include querying a device for a device ID or description after a device is found in step 405. For example, base unit 160 may utilize a discovery protocol to detect a wireless device.

Next, in step 415, base unit 160 attempts to determine if the detected wireless device is currently participating in an active telephone call. Base unit 160 may make such a determination in a variety of ways. For example, base unit 160 may listen to wireless communications between mobile device 110 and cordless headset 120, query one of the devices, or query server 170. For example, base unit 160 may passively listen to wireless communications between cordless headset 120 and mobile device 110 and attempt to determine if there is an established active voice channel open. An open voice channel, as opposed to an open audio channel, such as over the Bluetooth® protocol, may indicate that a user is on a telephone call using cordless headset 120.

Base unit 160 could also make the determination by querying mobile device 110, cordless headset 120, or even querying server 170. For example, base unit 160 could query mobile device 110 or cordless headset 120 and receive such data as a profile ID with a state identification. By determining the current state, base unit 160 may determine whether mobile device 110 is currently participating in an active telephone call. For example, a device may respond to a query from base unit 160 by indicating that a wireless communication link is active, and that the link is either audio or voice. If a device responds that the current state is an active audio channel, then a user is likely listening to music, as opposed to being engaged in a telephone call. If a device responds that the current state is an active voice channel, then a user is likely engaged in a telephone call. Base unit 160 could query server 170 to determine if there is an active telephone session for mobile device 110 over network 140. If there is no active telephone call, base unit 160 proceeds to step 405 and continues to search for wireless devices. If a wireless device is currently engaged in a telephone call, base unit 160 proceeds to step 420.

In step 420, base unit 160 attempts to determine if a user is currently using cordless headset 120 for voice communications with mobile device 110. Again, base unit 160 could be configured to passively listen for an open voice channel, or could be configured to query cordless headset 120 or mobile device 110 to make the determination.

Next, in step 425, base unit 160 sends a transfer prompt to mobile device 110, cordless headset 120, or both devices. Generally, the transfer prompt is communicated to a wireless device utilizing a previously established wireless communication link, such as those established using processes 200 and 300. A transfer prompt could simply be a tone, such as a call waiting tone. A call transfer prompt could also be a text message or graphical window asking a question, such as "Transfer call to home phone?" A transfer prompt could also include instructions for transforming certain buttons on mobile device 110 into soft keys. For example, a user could be instructed to press the star (*) key to transfer the call, and the pound (#) sign to continue using the mobile device.

Next, in step 430, base unit 160 determines if a user desires to transfer the currently established telephone call. As previously mentioned with regard to step 425, mobile device 110 and/or cordless headset 120 may receive a transfer prompt. Base unit 160 may wait a pre-determined amount of time for a response from a user. If no response is received within such a predetermined amount of time, such as 30 seconds, base unit 160 may interpret no response as an indication that a user does not want to transfer the call. Additionally, base unit 160 may receive one or more indications from mobile device 110 and/or cordless headset 120 that a user desires to transfer the existing telephone call. For example, a user of cordless headset 120 may press a function button on the headset. In addition, a user may press one or more keys on mobile device 110 to indicate a desire to transfer a call.

If base unit 160 interprets a user's action or inaction as a desire not to transfer the existing telephone call, base unit 160 proceeds to step 405. In addition, base unit 160 may also wait a certain amount of time before proceeding through process 400 again, or may simply ignore mobile device 110 for the remainder of the existing telephone call. Such measures can insure that a user is not prompted multiple times to transfer the same telephone call. If base unit 160 receives a response from mobile device 110 or cordless headset 120 indicating that a user desires to transfer the existing telephone call from mobile device 110, base unit 160 proceeds to step 435.

In step 435, base unit 160 checks to determine if base unit 160 and mobile device 110 are operating on the same provider network, as previously discussed with respect to step 240 of process 200. Base unit 160 may query mobile device 110, server 170, or may have such information stored in memory. For example, base unit 160 may find that base unit 160 and mobile device 110 share the same provider in step 240 of process 200, and store that information in memory. If base unit 160 determines that base unit 160 and mobile device 110 are not operating on the same provider network, then base unit 160 proceeds to step 440. If base unit 160 determines that base unit 160 and mobile device 110 share the same network provider, then base unit 160 proceeds to step 455.

In step 440, base unit 160 queries mobile device 110 for the phone number of the remote party, for example, the telephone number of remote telephone 152. Remote telephone 152 could be a land line telephone using POTS or PSTN, a cellular telephone, an Internet phone, such as a computer using VOIP, or any other device capable of carrying out voice communications with mobile device 110. As previously discussed, mobile device 110 may be configured to allow base unit 160 to access stored data, such as a call session log and a phone book. Base unit 160 can check a call log to determine who the remote party is, and then access a phone book to obtain a phone number for the remote party. For example, a call log may indicate that the user is currently talking to Jane Doe's business phone number. Base unit 160 may then access the phone book stored on mobile device 110 to obtain Jane Doe's business phone number.

In one example, base unit 160 is capable of switching between parent and child mode in order to communicate with mobile device 110 and cordless headset 120. For example, base unit 160 may switch to child mode, pair with mobile device 110, and then query mobile device 110 for the phone number of the remote party. Base unit 160 may then switch back to parent mode, pair with cordless headset 120, and continue communicating with cordless headset 120, including allowing cordless headset 120 to establish voice communications through base unit 160.

Next, in step 445, base unit 160 attempts to call the remote party by dialing remote telephone 152. If the call fails or if the line is busy, base unit 160 may be programmed to retry the call after a certain amount of time. By calling the remote party, base unit 160 attempts to establish a voice communication link between base unit 160 and remote telephone 152 via one or more networks, such as networks 140 and 142. Typically, such a telephone call utilizes one or more networks 140 and 142, and establishes a VOIP or PSTN telephone call between base unit 160 and the remote party.

Next, in step 450, base unit 160 waits for the remote party to answer the telephone call. Base unit 160 may be programmed to wait for a predetermined amount of time, or may simply wait until there is an answer or the call goes to voice mail. Once the remote party answers the call, base unit 160 proceeds to step 470. Base unit 160 may also provide the remote party with a recorded message, such as "please hold the line, your party will be right with you," and/or music to play so that the remote party knows that a voice communication link between base unit 160 and remote telephone 152 has been established. Following step 450, base unit 160 proceeds to step 470.

In step 460, base unit 160 rings or "calls" mobile device 110 and/or cordless headset 120. Ringing mobile device 110 may be accomplished by utilizing the previously established wireless communication link and sending a request to establish voice communications between the devices. Base unit 160 may send an equivalent of a "call waiting" signal to indicate that a user has an incoming call. If base unit previously determined that a user is using a cordless headset 120, base unit 160 may only ring the cordless headset 120. However, base unit 160 may attempt to ring both mobile device 110 and cordless headset 120, and simply allow a user to decide which device to use in conjunction with base unit 160.

Base unit 160 may be programmed to only ring mobile device 110 if no cordless headset 120 was detected. However, base unit 160 may be programmed to attempt to ring cordless headset 120 regardless of whether cordless headset 120 was detected just in case headset 120 was previously out of range or not turned on, but is now available for use. Mobile device 110 may be configured to wirelessly communicate with base unit 160, using Bluetooth® or WiFi®, for example. A user may choose to continue using mobile device 110, but transfer the telephone call between mobile device 110 and remote telephone 152 such that the call travels through base unit 160 and network 142 as opposed to continuing the call over base station 130. In other words, base unit 160 may act as a cell tower (i.e. base station), thus facilitating voice communications between mobile device 110 and a remote telephone 152 via network 142.

Next, in step 465, base unit 160 waits for a user to "click over" or establish a connection with base unit 160. For example, a user may establish a voice communication link with base unit 160 simply by answering a telephone call, such as by responding to a call waiting indicator. Once the voice communication link is established, base unit 160 proceeds to step 470.

Next, in step 470, base unit 160 finalizes the call handoff by bridging the remote party and the wireless device together. For example, a user of mobile device 110 may answer the call from base unit 160, and base unit 160, having already established a voice communication link with remote telephone 152, can then bridge mobile device 110 and remote telephone 152 together. Base unit 160 can also establish a bridge between cordless headset 120 and remote telephone 152.

If base unit 160 determined in step 435 that base unit 160 and mobile device 110 share the same network provider, then base unit 160 proceeds to step 455 to establish the voice communication link with the remote party. In step 455, base unit 160 sends a request to server 170 for to conference in with the currently establish telephone call between wireless device 110 and remote telephone 152. Base unit 160 may send a device identification of mobile device 110 along with the request, such as a MAC address, a mobile identification number (MIN), a mobile dialing number (MIN), a telephone number, or some other identifier.

As previously discussed, if base unit 160 and mobile device 110 share the same network provider, then base unit 160 may be able to access certain servers and services that can help facilitate a call handoff. Server 170, for example, may also be able to control the telephone call between mobile device 110 and remote telephone 152. For example, server 170 may be able to place parties on hold, conference in third parties, drop connections, etc.

For example, server 170 may not only store session information about the telephone call, but also have the ability to modify the telephone call between mobile device 110 and remote telephone 152. Server 170 may query a database for session information about the telephone call between mobile device 110 and remote telephone 152, place the remote party on hold, conference in base unit 160, and then drop mobile device 110 from the call. Server 170 may provide a recorded message informing the remote party of what is happening, and/or may provide music to inform the remote party that the call was not lost. Server 170 may also provide a recorded message to a user of mobile device 110. Following step 455, base unit 160 and remote telephone 152 will have an established voice communication link. Also following step 455, base unit 160 will proceed to step 460 to allow a user to finish the call handoff and continue conversing with the remote party using mobile device 110 or cordless headset 120.

Of course, certain steps of process 400 may be omitted when mobile device 110 and base unit 160 share the same network provider. For example, base unit 160 may automatically establish the voice communication bridge between mobile device 110 or cordless headset 120 with remote telephone 152, without first ringing the wireless device and waiting for an answer, thereby omitting steps 460 and 465. Following step 470, base unit 160 will now facilitate voice communications with remote telephone 152, either between mobile device 110 or cordless headset 120. In addition, base unit 160 may be further configured to wirelessly communicate with a cordless home telephone system as well. In such an example, base unit 160 may perform certain steps from processes 200, 300, and 400 to establish wireless communications between base unit 160, and transfer a call between the home phone system and a wireless device, such as mobile device 110 or cordless headset 120. For example, base unit 160 could establish a voice connection between base unit 160 and a remote party, and then ring home telephone 150 over a wireless communication link, such as over DECT, allowing a user to pick-up a cordless home handset and continue a conversation via base unit 160.

Certain devices of system 100, such as mobile device 110, cordless headset 120, base unit 160, server 170, and other devices mentioned herein may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system and the Vortex operating system distributed by Motorola, Inc. of Schaumberg, Ill. Computing devices may include any one of a number of computing devices that are known, including, without limitation, a computer workstation, a desktop, notebook, laptop, handheld computer, or some other computing device. Certain devices, such as mobile device 110, cordless headset 120, and base unit 160, may use an embedded operating system or a proprietary operating system.

Devices mentioned herein are generally capable of executing instructions stored on a computer readable medium, such as instructions for performing one or more of the above-identified processes. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer, a microcontroller, etc.). Such a medium may take many forms, including, but not limited to, non-volatile media and volatile medial. Non-volatile media may include, for example, optical or magnetic disks, read-only memory (ROM), and other persistent memory. Volatile media may include, for example, dynamic random access memory (DRAM), which typically constitutes a main memory. A transmission media may facilitate the processing of instructions by carrying instructions from one component or device to another. For example, a transmission media may facilitate electronic communication between base unit 160 and telecommunications server 170. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims. All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

I claim:

1. A device configured to:
   detect a wireless device;
   determine if the wireless device is participating in a telephone call with a remote party;
   send a transfer prompt to the wireless device;
   receive a response to the transfer prompt;
   establish a first voice communication link with the remote party and a second voice communication link with the wireless device after receiving the response to the transfer prompt; and
   bridge the first and second voice communication links together, thereby establishing voice communications between the wireless device and the remote party.

2. The device of claim 1, further configured to pair with the wireless device, wherein the wireless device is one of a cordless headset, a cellular phone, a personal digital assistant, and a hand held computer.

3. The device of claim 1, further configured to determine if the wireless device is participating in a telephone call with a remote party by detecting an open voice channel between a cordless headset and a mobile device.

4. The device of claim 1, further configured to determine if the wireless device is participating in a telephone call with a remote party by querying at least one of a mobile device and a telecommunications server.

5. The device of claim 2, further configured to:
   ring at least one of the cordless headset and the mobile device after establishing the first voice communication link with the remote party;
   receive a response from at least one of the cordless headset and the mobile device; and
   establish the second voice communication link with at least one of the cordless headset and the mobile device after receiving the response.

6. The device of claim 1, further configured to:
   query the wireless device for a phone number of the remote party; and
   establish the first voice communication link with the remote party using the phone number of the remote party.

7. The device of claim 1, further configured to:
   query the wireless device for a device identification; and
   send the device identification to a telecommunications server, wherein the telecommunications server utilizes the device identification to establish the first voice communication link with the remote party.

8. The device of claim 7, further configured to determine which provider network the wireless device is currently utilizing.

9. The device of claim 1, further configured to:
   switch to a parent mode;
   pair with a cordless headset;
   switch to a child mode; and
   pair with a mobile device.

10. A device, comprising:
    a wireless communication system capable of communicating with a wireless device, wherein the wireless device is at least one of a mobile device and a cordless headset;
    a broadband communication system capable of providing voice communication services over a packet switched network; and
    instructions stored on a computer-readable medium and executable on a processor, the instructions including instructions for
    detecting at least one of the mobile device and the cordless headset via the wireless communication system,
    determining if the mobile device is participating in a telephone call with a remote party,
    sending a transfer prompt to at least one of the mobile device and the cordless headset via the wireless communication system,
    receiving a response to the transfer prompt,
    establishing a first voice communication link with the remote party via the broadband communication system,
    establishing a second voice communication link with at least one of the cordless headset and the mobile device via the wireless communication system, wherein the first and second voice communication links are established after receiving the response to the transfer prompt and
    bridging the first and second voice communication links together.

11. The device of claim 10, wherein the wireless communication system utilizes at least one of the following: Bluetooth, WiFi, IEEE 802.11, ZigBee, Z-Wave, and OpenWave.

12. The device of claim 10, wherein the instructions further include instructions for determining if the mobile device is participating in a telephone call with a remote party by detecting an open voice channel between the cordless headset and the mobile device.

13. The device of claim 10, wherein the instructions further include instructions for ringing at least one of the cordless headset and the mobile device after establishing the first voice communication link with the remote party,
- receiving a response from at least one of the cordless headset and the mobile device, and
- establishing the second voice communication link with at least one of the cordless headset and the mobile device after receiving the response.

14. The device of claim 10, wherein the instructions further include instructions for querying the mobile device for a phone number of the remote party; and
- establishing the first voice communication link with the remote party using the phone number of the remote party.

15. The device of claim 10, wherein the instructions further include instructions for querying the mobile device for a device identification, and
- sending the device identification to a telecommunications server, wherein the telecommunications server utilizes the device identification to establish the first voice communication link with the remote party.

16. The device of claim 10, wherein the instructions further include instructions for determining which provider network the mobile device is currently utilizing.

17. A method, comprising:
- establishing a wireless communication link with at least one of a mobile device and a cordless headset;
- determining if the mobile device is participating in a telephone call with a remote party;
- determining whether the mobile device and a base unit operate on a common provider network;
- establishing a first voice communication link with the remote party by sending a request to a telecommunications server if the mobile device and the base unit operate on a common provider network;
- establishing a first voice communication link with the remote party by calling the remote party if the mobile device and the base unit do not operate on a common provider network;
- establishing a second voice communication link with at least one of the cordless headset and the mobile device; and
- bridging the first and second voice communication links together.

18. The method of claim 17, further comprising pairing with at least one of the cordless headset and the mobile device.

19. The method of claim 17, further comprising:
- sending a transfer prompt to at least one of the cordless headset and the mobile device;
- receiving a response to the transfer prompt; and
- establishing the first and second voice communication links only after receiving the response.

20. The method of claim 17, further comprising:
- pairing with the cordless headset;
- pairing with the mobile device; and
- determining if the mobile device is participating in a telephone call with a remote party by detecting an open voice channel between the cordless headset and the mobile device.

21. The method of claim 17, further comprising determining if the mobile device is participating in a telephone call with a remote party by querying at least one of the mobile device and the telecommunications server.

22. The method of claim 17, further comprising:
- querying the mobile device for a phone number of the remote party if the mobile device and the base unit do not operate on a common provider network; and
- establishing the first voice communication link with the remote party using the phone number of the remote party.

23. The method of claim 17, further comprising:
- querying the mobile device for a device identification if the mobile device and the base unit operate on a common provider network; and
- including the device identification in the request sent to the telecommunications server, wherein the telecommunications server utilizes the device identification to establish the first voice communication link with the remote party.

* * * * *